(12) United States Patent
Lee et al.

(10) Patent No.: US 9,264,994 B2
(45) Date of Patent: Feb. 16, 2016

(54) METHOD AND DEVICE FOR PERFORMING COMMUNICATION IN A WIRELESS COMMUNICATION SYSTEM

(75) Inventors: Hyun Woo Lee, Anyang-si (KR); Ji Woong Jang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 13/638,530

(22) PCT Filed: Mar. 28, 2011

(86) PCT No.: PCT/KR2011/002112
§ 371 (c)(1),
(2), (4) Date: Sep. 28, 2012

(87) PCT Pub. No.: WO2011/122813
PCT Pub. Date: Oct. 6, 2011

(65) Prior Publication Data
US 2013/0021960 A1    Jan. 24, 2013

Related U.S. Application Data

(60) Provisional application No. 61/320,301, filed on Apr. 1, 2010.

(30) Foreign Application Priority Data

Mar. 23, 2011    (KR) .................. 10-2011-0025954

(51) Int. Cl.
*H04W 52/02* (2009.01)
*H04W 80/04* (2009.01)
*H04W 88/06* (2009.01)
*H04L 1/00* (2006.01)
*H04B 7/06* (2006.01)

(52) U.S. Cl.
CPC ........... *H04W 52/0216* (2013.01); *H04B 7/063* (2013.01); *H04B 7/0639* (2013.01); *H04L 1/0003* (2013.01); *H04L 1/0009* (2013.01); *H04L 1/0015* (2013.01); *H04W 52/0219* (2013.01); *H04W 52/0261* (2013.01)

(58) Field of Classification Search
CPC . H04W 52/02; H04W 52/0216; H04W 80/04; H04W 88/06
USPC .................................. 370/311, 328
See application file for complete search history.

(56) References Cited

U.S. PATENT DOCUMENTS

| | | | |
|---|---|---|---|
| 2005/0163088 A1* | 7/2005 | Yamano et al. | 370/338 |
| 2005/0237971 A1* | 10/2005 | Skraparlis | 370/329 |
| 2007/0121547 A1* | 5/2007 | Huh et al. | 370/329 |

(Continued)

FOREIGN PATENT DOCUMENTS

| | | |
|---|---|---|
| WO | WO 00/04728 | 1/2000 |
| WO | WO 01/76110 A2 | 10/2001 |
| WO | WO 2006/020339 A2 | 2/2006 |

(Continued)

*Primary Examiner* — Ronald B Abelson
(74) *Attorney, Agent, or Firm* — Dentons US LLP

(57) ABSTRACT

One suggested specific embodiment of the present invention relates to a communication method and device for improved performance. For example, a method for requesting information related to energy (or power) consumption of a terminal and receiving a report of related information from the terminal, and a mobile terminal may be provided. When the method and terminal are used, energy that the terminal consumes may be efficiently controlled.

9 Claims, 16 Drawing Sheets

(56) References Cited

U.S. PATENT DOCUMENTS

2008/0107119 A1* 5/2008 Chen et al. ............... 370/395.21
2008/0233992 A1* 9/2008 Oteri et al. .................... 455/522
2009/0068969 A1* 3/2009 Lindoff et al. ............. 455/161.1
2009/0238196 A1* 9/2009 Ukita et al. ................... 370/408

FOREIGN PATENT DOCUMENTS

WO WO 2010/127725 * 11/2010 ............... H04B 1/16

* cited by examiner

METHOD AND DEVICE FOR PERFORMING COMMUNICATION IN A WIRELESS COMMUNICATION SYSTEM

TECHNICAL FIELD

This Application is a 35 U.S.C. §371 National Stage Entry of International Application No. PCT/KR2011/002112, filed Mar. 28, 2011 and claims the benefit of U.S. Provisional Application No. 61/330,301, filed Apr. 1, 2010, all of which are incorporated by reference in their entirety herein.

BACKGROUND ART

In general, a wireless communication system includes a mobile terminal and a base station (BS). The mobile terminal and the BS may transmit/receive information related to a channel state in order to improve performance in terms of throughput or goodput. For example, a mobile terminal and a BS in an IEEE (Institute of Electrical and Electronics Engineers) 802.16m system or 3GPP (3rd Generation Partnership Project) LTE (Long Term Evolution) system may transmit and receive information regarding a channel state. Types of information regarding a channel state are not limited, and, for example, a CQI (Channel Quality Indicator), a PMI (Pre-Coding Matrix Index), an MCS (Modulation & Coding Scheme), sounding, and information regarding MIMO (e.g., a MIMO rate or rank) may be information regarding a channel state.

TECHNICAL PROBLEM

In case of a general wireless communication system, performance thereof is improved in terms of throughput or goodput in consideration of H2H (Human-2-Human). However, recently, as interest in energy efficiency of a wireless communication system has been increased, the improvement of energy efficiency of the conventional wireless communication system is required. For example, M2M (Machine-2-Machine) is expected to be commonly used in the future, and in M2M communication, a plurality of sensors may be used without fixed power supply. In this case, a communication technique in consideration of energy efficiency is expected to be more important, relative to conventional H2H communication. A specific example hereinafter proposes a communication method and device having improved energy efficiency.

TECHNICAL PROBLEM

Hereinafter, a communication method and device having improved performance are proposed. For example, a specific example hereinafter provides a technique for requesting information regarding energy (or power) consumption of a terminal and receiving a report on relevant information from the terminal. A specific example hereinafter is able to effectively control energy consumed by a terminal through information regarding energy consumption of the terminal.

A specific example hereinafter relates to a method for performing communication in a wireless communication system. The method includes: transmitting a parameter related to energy consumption of a terminal to a base station (BS); receiving information regarding a communication technique determined based on the parameter from the BS; and performing communication with the BS according to the determined communication technique.

The method may further include: receiving a request message for requesting the parameter from the BS, before the parameter related to energy consumption of the terminal.

The method may further include: transmitting a bandwidth request message or a scheduling message to the BS, before the information regarding a communication technique is received after the parameter related to energy consumption of the terminal is transmitted.

The parameter related to energy consumption of the terminal may be determined based on at least an MCS (modulation and coding scheme) level of the terminal, the energy consumption may be calculated by the terminal or determined according to a correspondence table stored in the terminal, and the MCS level may be used for uplink or downlink.

The parameter related to energy consumption of the terminal may include information regarding energy consumption corresponding to each of a plurality of MCS levels including a current MCS level of the terminal and at least one MCS level adjacent to the current MCS level, and energy consumption corresponding to each of the plurality of MCS levels may be calculated by the terminal or determined according to the correspondence table stored in the terminal.

The information regarding a communication technique may be at least one of information regarding an MCS level of the terminal and information regarding a MIMO (multiple-input and multiple-output) technique of the terminal, and in the performing of communication with the BS according to the determined communication technique, communication may be performed according to the MCS level and the MIMO technique.

The parameter related to energy consumption of the terminal may be transmitted via a CQI (channel quality indicator) channel.

The parameter related to energy consumption of the terminal may be included in a bandwidth request message or a scheduling request message.

The parameter related to energy consumption of the terminal may be transmitted to the BS during a process of negotiation for communication between the BS and the terminal.

The transmitting of the parameter related to energy consumption of the terminal to the BS may be performed only when a remaining battery capacity of the terminal is equal to or less than a threshold value.

The wireless communication system may perform communication by using an OFDMA (orthogonal frequency-division multiple access) symbol or an SC-FDMA (single-carrier frequency-division multiple access) symbol.

A specific example hereinafter provides a terminal of a wireless communication system. The terminal includes a processor configured to control an operation of the terminal; and a transceiver unit controlled by the processor and configured to transmit a parameter related to energy consumption of the terminal to a base station (BS), receive information regarding a communication technique determined based on the parameter from the BS, and perform communication with the BS according to the determined communication technique.

ADVANTAGEOUS EFFECTS

According to embodiments of the present invention, a base station included in a general communication system cannot accurately estimate information regarding energy consumption of a terminal, making it difficult to perform effective communication. However, in specific examples hereinafter, information regarding energy consumption of a terminal is reported to a base station, so energy efficient communication can be performed.

BEST MODES

The following technique may be used for various multiple access schemes such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for Mobile communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. UTRA (UMTS Terrestrial Radio Access) is part of UMTS (Universal Mobile Telecommunications System). 3GPP (3rd Generation Partnership Project) LTE (long term evolution) is part of E-UMTS (Evolved UMTS) using E-UTRA, which employs OFDMA in downlink and SC-FDMA in uplink. LTE-A (Advanced) is an advancement of 3GPP LTE.

Hereinafter, in order to clarify description, embodiments of the present invention will be described based on IEEE 802.16m and 3GPP LTE (Long Term Evolution). However, examples hereinafter may also be applied to any other communication standards.

Hereinafter, IEEE 802.16m will be described. IEEE 802.16e standard was adapted in the name of 'WMAN-OFDMA TDD' as the sixth standard for IMT (International Mobile Telecommunication)-2000 at ITU-R (ITU Radiocommunication Sector) under the umbrella of ITU (International Telecommunication Union) in 2007. ITU-R is preparing an IMT-Advanced system as a next-generation 4G mobile communication standard after IMT-2000. IEEE 802.16 WG (Working Group) decided to carry forward an IEEE 802.16m project aiming at establishing an amendment standard of existing IEEE 802.16e. As noted from the aim, the IEEE 802.16m standard involves two aspects: past continuity of an amendment of the IEEE 802.16e standard and future continuity of a standard for a next-generation IMT-Advanced system. Thus, the IEEE 802.16m standard is required to satisfy all the advanced requirements for an IMT-Advanced system, while maintaining compatibility with a mobile WiMAX system based on the IEEE 802.16e standard.

Figure 1:
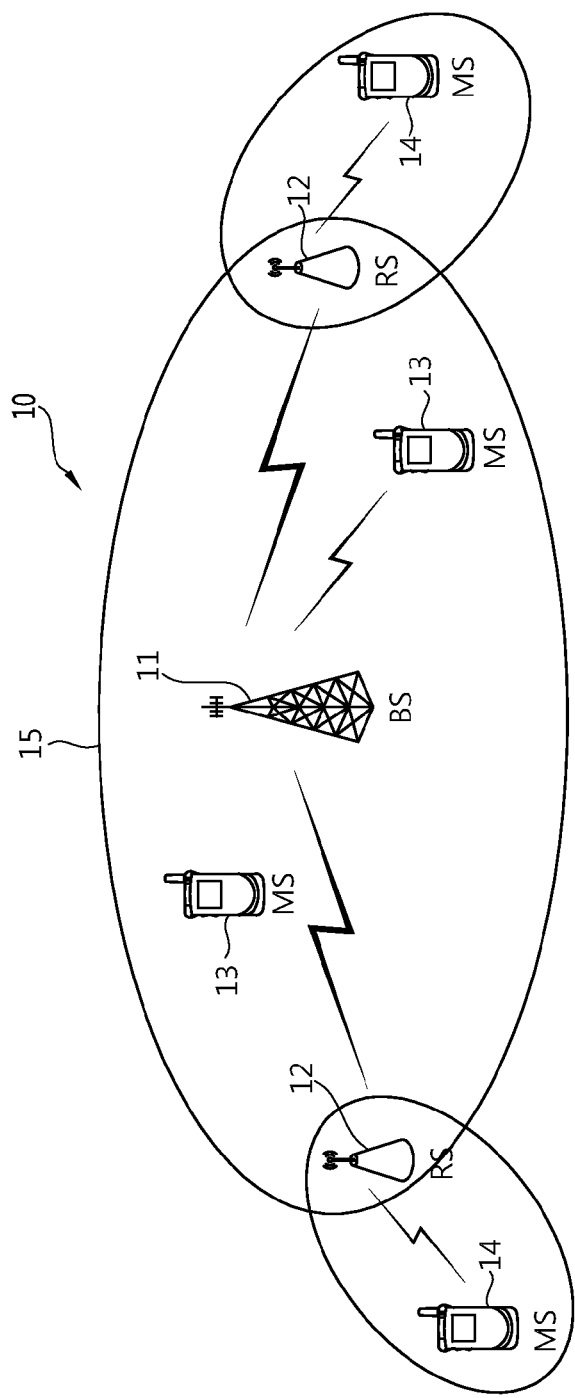
FIG. 1 is view illustrating a wireless communication system including terminals.

FIG. 1 shows a wireless communication system including terminals (or mobile stations (MSs)).

Referring to FIG. 1, the wireless communication system 10 including MSs includes at least one base station (BS) 11. Each BS 11 provides a communication service to a particular geographical area 15 generally called a cell. A cell may be divided into a plurality of areas, and each area is called a sector. One or more cells may exist within coverage of a single BS, and one or more BSs may exist in a single cell. The BS 11 generally refers to a fixed station that communicates with an MS 13 and may be called by other names such as evolved NodeB (eNB), base transceiver system (BTS), access point (AP), access network (AN), advanced base station (ABS), node (or antenna node), or the like. The BS 11 may include a relay station (RS) 12. In this case, the BS 11 may perform functions such as connectivity, management, control, and resource allocation between the RS 12 and an MS 14.

The RS 12 refers to a device that relays a signal between the BS 11 and the MS 14 and may be called by other names such as relay node (RN), repeater, relay, advanced RS, or the like.

The MSs 13 and 14 may be fixed or mobile, which may be referred to by other names such as advanced mobile station (AMS), user terminal (UT), subscriber station (SS), wireless device, personal digital assistant (PDA), wireless modem, handheld device, access terminal (AT), user equipment (UE), or the like. Hereinafter, a macro MS refers to a terminal that directly communicates with the BS 11, and a relay station terminal refers to a terminal that communicates with an RS. Even the macro MS within the cell of the BS 11 may communicate with the BS 11 through the RS 12 in order to improve a transfer rate according to a diversity effect.

Between a BS and a macro MS, downlink (DL) refers to communication from the BS to the macro MS and uplink refers to communication from the macro MS to the BS. Between a BS and an RS, downlink refers to communication from the BS to the RS and uplink refers to communication from the RS to the BS. Between an RS and an RS MS, downlink refers to communication from the RS to the RS MS and uplink refers to communication from the RS MS to the RS.

Figure 2:
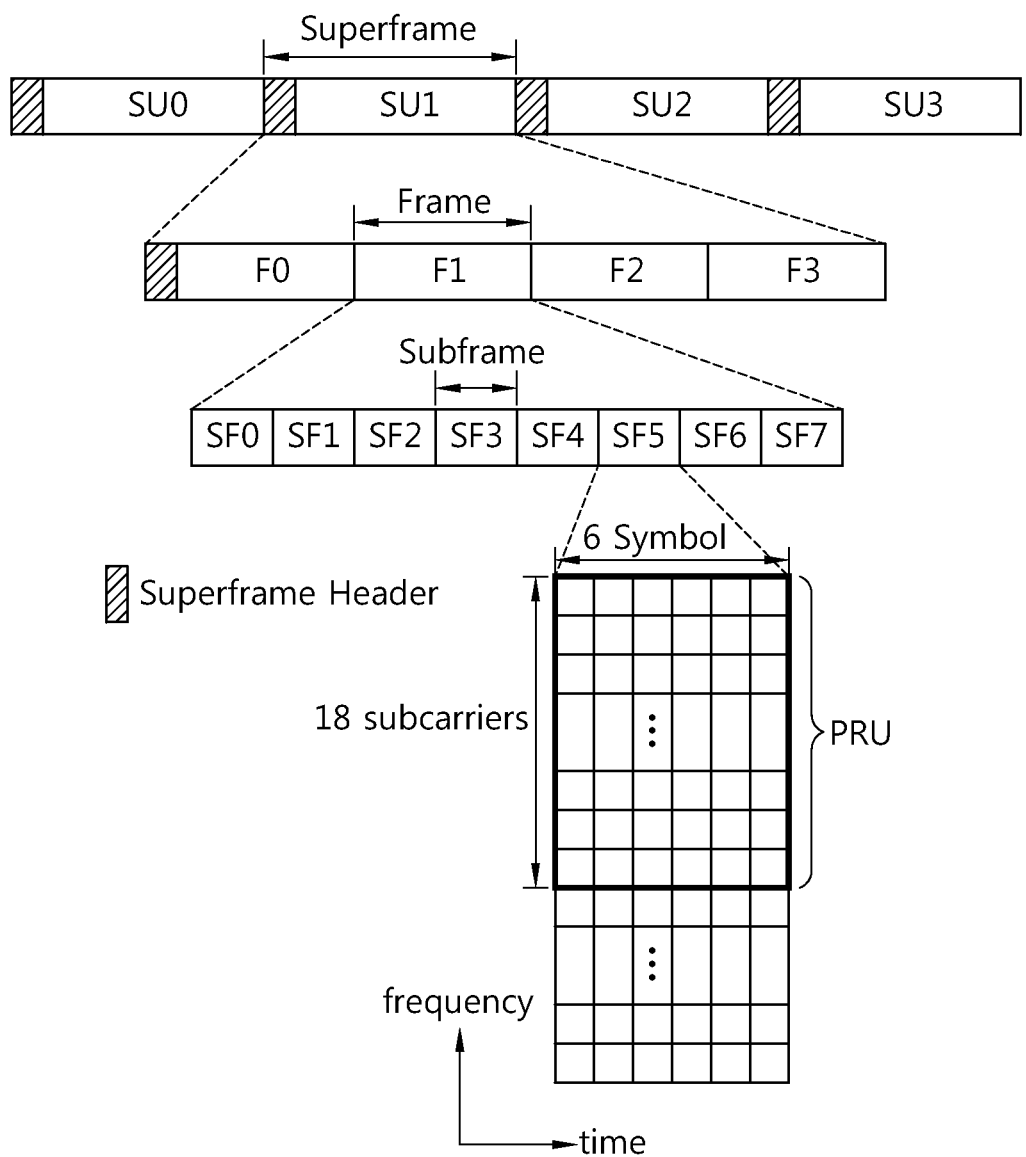
FIG. 2 is a view illustrating an example of a frame structure.

FIG. 2 shows an example of a frame structure.

Referring to FIG. 2, a superframe (SF) includes a superframe header (SFH) and four frames F0, F1, F2, and F3. Each of the frames may have the same length in the SF. Although it is illustrated that each SF has a length of 20 milliseconds (ms) and each frame has a length of 5 ms, the present invention is not limited thereto. The length of the SF, the number of frames included in the SF, the number of subframes included in a frame, or the like may be changed variously. The number of subframes included in a frame may be changed variously according to a channel bandwidth and a length of a cyclic prefix (CP).

One frame may include a plurality of subframes SF0, SF1, SF2, SF3, SF4, SF5, SF6, and SF7. Each subframe may be used for uplink or downlink transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol serves to denote one symbol period, and may be referred to by other names such as OFDMA symbol, SC-FDMA symbol, or the like, according to a multi-access scheme. The subframe may be comprised of five, six, seven, or nine OFDM symbols, but it is merely illustrative and the number of OFDM symbols included in a subframe is not limited thereto. The number of OFDM symbols included in a subframe may be changed variously according to a channel bandwidth and a CP length. A subframe type may be defined according to the number of OFDMA symbols included in a subframe. For example, a type-1 subframe may be defined to include six OFDMA symbols, a type-2 subframe may be defined to include seven OFDMA symbols, a type-3 subframe may be defined to include five OFDMA symbols, and a type-4 subframe may be defined to include nine OFDMA symbols. A single frame may include the same type of subframes. Alternatively, a single frame may include different types of subframes. Namely, the number of OFDMA symbols included in each subframe may be equal or different in a frame. Alternatively, the number of OFDMA symbols included in at least one subframe of a single frame may be different from the number of OFDM symbols of the other remaining subframes of the frame.

Time division duplex (TDD) or frequency division duplex (FDD) may be applied to a frame. In the TDD, each subframe is used for uplink or downlink transmission at the same frequency and at a different time. Namely, subframes included in a TDD frame are divided into an uplink subframe and a downlink subframe in the time domain. A switching point refers to a point at which a transmission direction is changed from an uplink region to a downlink region or from a downlink region to an uplink region. In the TDD scheme, the number of switching points in each frame may be 2. In the FDD, each subframe is used for uplink or downlink transmission at different frequencies during the same time. Namely, subframes included in an FDD frame are divided into an uplink subframe and a downlink subframe in the frequency domain. Uplink transmission and downlink transmission occupy different frequency bands and may be simultaneously performed.

Figure 3:
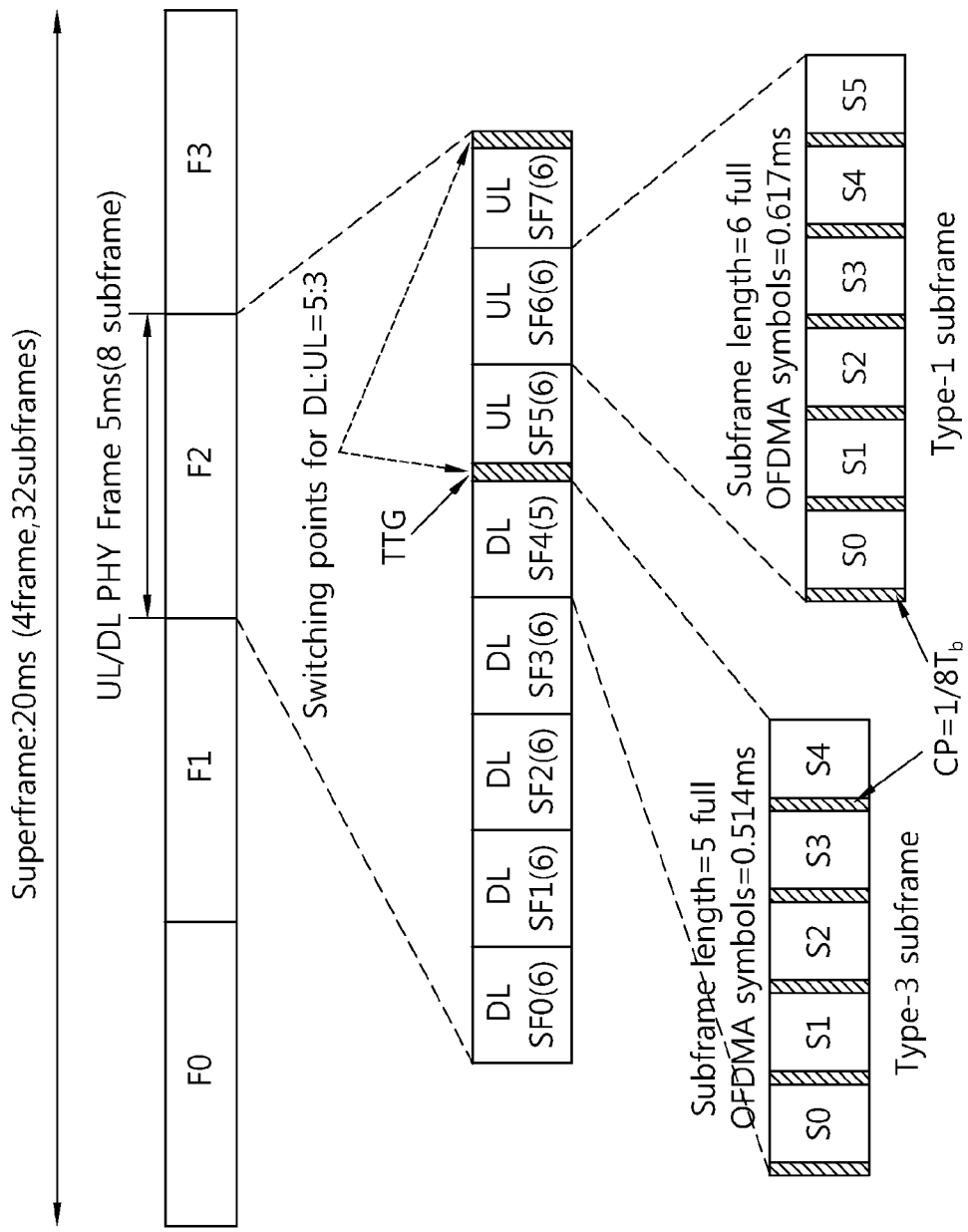
FIG. 3 is a view illustrating an example of a TDD frame structure.

FIG. 3 shows an example of a TDD frame structure, in which G=⅛. An SF having a length of 20 ms includes four frames (F0, F1, F2, and F3) each having a length of 5 ms. A single frame is comprised of eight subframes (SF0, SF1, SF2, SF3, SF4, SF5, SF6, and SF7), and a ratio between downlink subframes and uplink subframes is 5:3. The TDD frame structure of FIG. 3 may be applied to a case in which a bandwidth is 5 MHz, 10 MHz, or 20 MHz. The ending downlink subframe SF4 includes five OFDMA symbols, while the other remaining subframes include six subframes. An illustrated TTG represents a transition gap between uplink and downlink subframes.

Figure 4:
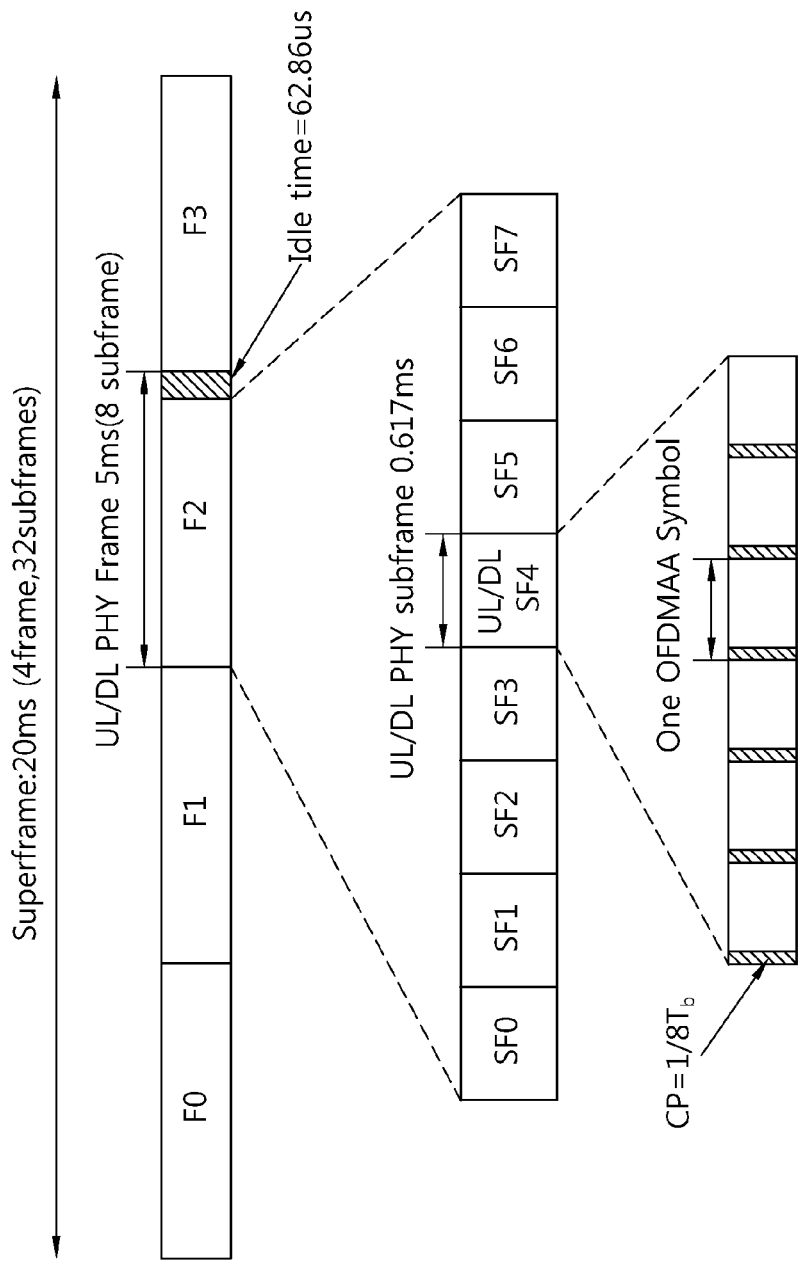
FIG. 4 is a view illustrating an example of an FDD frame structure.

FIG. 4 shows an example of an FDD frame structure, in which G=⅛. An SF having a length of 20 ms includes four frames (F0, F1, F2, and F3) each having a length of 5 ms. A single frame is comprised of eight subframes (SF0, SF1, SF2, SF3, SF4, SF5, SF6, and SF7), and all the subframes include a downlink area and an uplink area. The FDD frame structure of FIG. 4 may be applied to a case in which a bandwidth is 5 MHz, 10 MHz, or 20 MHz.

Figure 5:
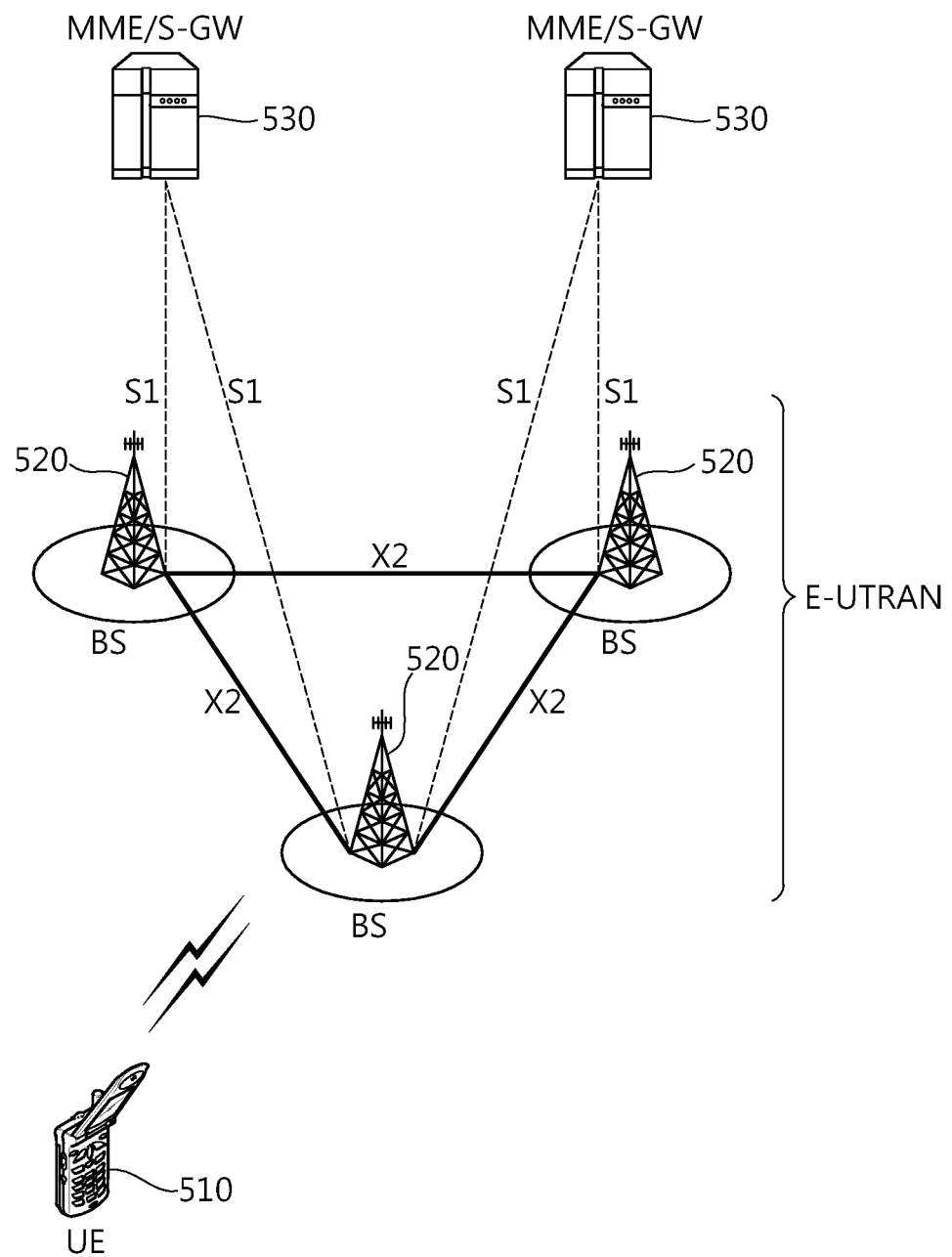
FIG. 5 is a block diagram of a wireless communication system according to an E-UMTS system.

Hereinafter, an E-UMTS (Evolved-Universal Mobile Telecommunications System) or an LTE system will be described. FIG. 5 is a block diagram illustrating a wireless communication system according to an E-UMTS system. An E-UMTS system may be called an LTE (Long Term Evolution) system. A wireless communication system may be widely disposed to provide various communication services such as voice, packet data, and the like.

Referring to FIG. 5, an E-UTRAN (Evolved-UMTS Terrestrial Radio Access Network) includes a BS 520 providing a control plane and a user plane.

A terminal (or a UE) 510 may be fixed or mobile and may be called by other names such as mobile station (MS), user terminal (UT), subscriber station (SS), wireless device, or the like. The BS 520 generally refers to a fixed station that communicates with the UE 510 and may be called by other names such as evolved NodeB (eNB), base transceiver system (BTS), access point (AP), access network (AN), and the like. One BS 520 may provide a service to at least one cell. A cell is an area providing a communication service. An interface for user traffic or control traffic transmission may be used between BSs 520. Hereinafter, downlink refers to transmission from the BS 520 to the UE 510, and uplink refers to transmission from the UE 510 to the BS 520.

The BSs 520 may be connected to each other via an interface X1. The BS 520 is connected to an EPC (Evolved Packet Core), specifically, to an MME (Mobility Management Entity)/S-GW (Serving Gateway 530, via an interface S1. The interface S1 supports a many-to-many relationship between the BS 520 and the MME/S-GWs 530.

Layers of the radio interface protocols between a UE and a network may be divided into a first layer L1, a second layer L2, and a third layer L3 based on the three lower layers of an open system interconnection (OSI) standard model widely known in communication systems. The first layer is a physical (PHY) layer. The second layer may be divided into a medium access control (MAC) layer, a radio link control (RLC) layer, and a packet data convergence protocol (PDCP) layer. The third layer is a radio resource control (RRC) layer.

The wireless communication system may be based on OFDM (Orthogonal Frequency Division Multiplexing)/ OFDMA (Orthogonal Frequency Division Multiple Access) or SC-FDMA (Single Carrier FDMA).

OFDM uses a plurality of orthogonal subcarriers. OFDM uses orthogonality characteristics between IFFT (inverse fast Fourier Transform) and FFT (fast Fourier Transform). A transmitter performs IFFT on data and transmits the same. A receiver performs FFT on a reception signal to restore the original data. The transmitter uses IFFT in order to couple multiple subcarrier, and the receiver uses corresponding FFT in order to separate multiple subcarriers.

Figure 6:
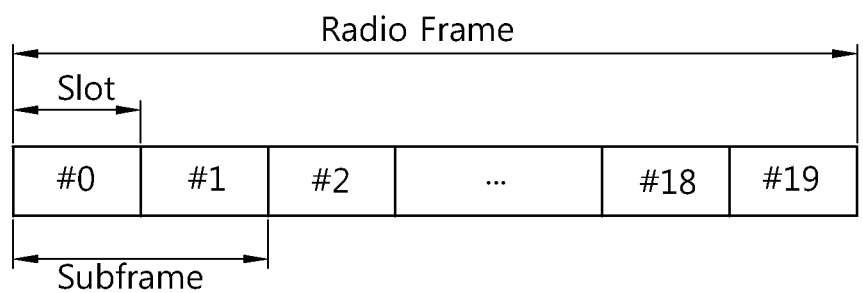
FIG. 6 is a view illustrating a structure of a radio frame.

FIG. 6 illustrates a structure of a radio frame. Referring to FIG. 6, a radio frame may be comprised of ten subframes, and a single subframe may be comprised of two slots. Slots of the radio frame are numbered from #0 to #19. A time taken for one subframe to be transmitted is called a TTI (transmission time interval). A TTI may be a scheduling unit for data transmission. For example, a length of one radio frame may be 10 ms, a length of one subframe may be 1 ms, and a length of one slot may be 0.5 ms. The structure of the radio frame is merely illustrative, and the number of subframes included in a radio frame or the number of slots included in a subframe may be variously changed.

Figure 7:
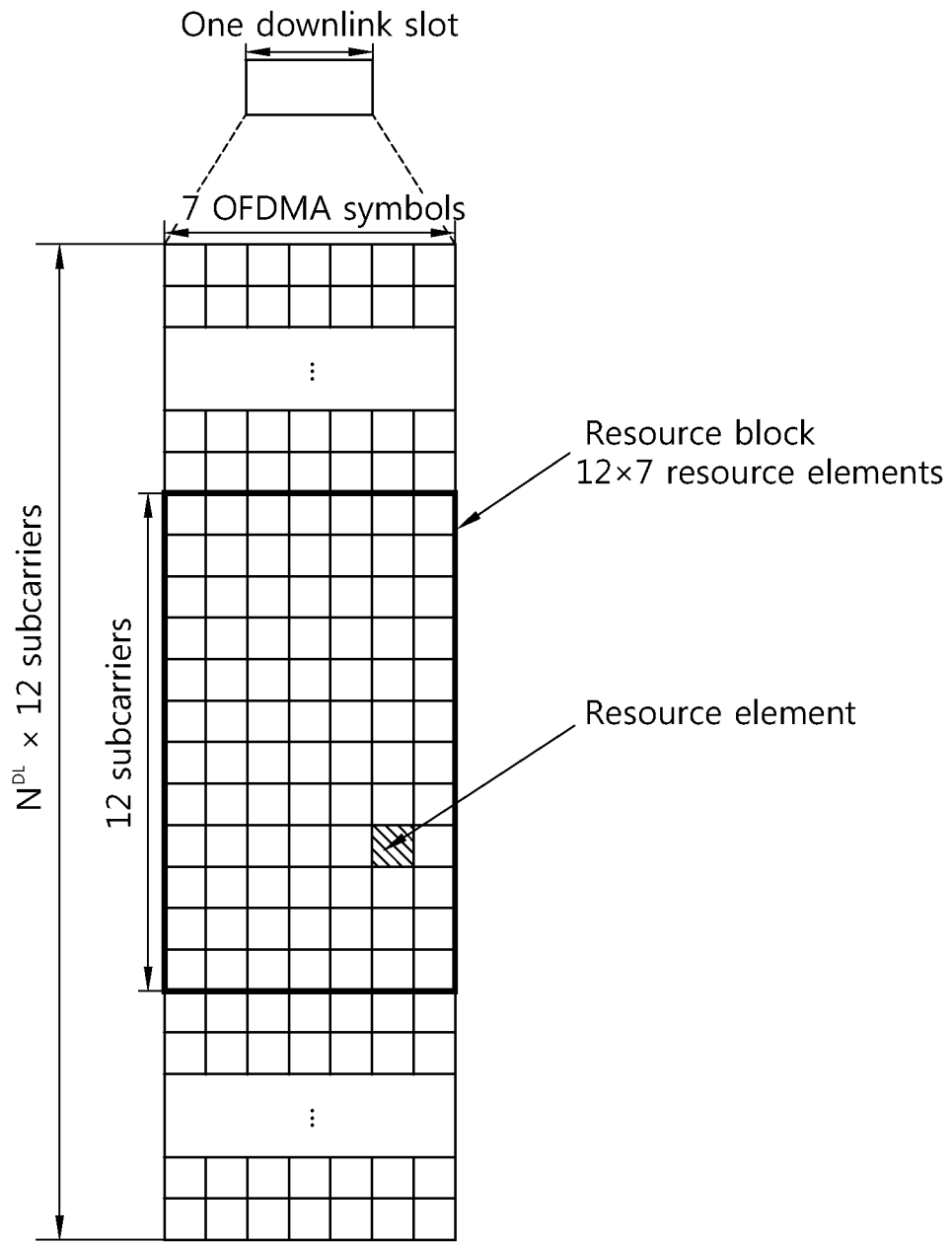
FIG. 7 is view illustrating a resource grid of a single downlink slot.

FIG. 7 illustrates a resource grid of a single downlink slot. Referring to FIG. 7, a downlink slot includes a plurality of OFDM symbols in the time domain and $N^{DL}$ number of resource blocks (RBs) in the frequency domain. The $N^{DL}$ number of resource blocks included in the downlink slot is dependent upon a downlink transmission bandwidth set in a cell. For example, in an LTE system, $N^{DL}$ may be any one of 60 to 110. One resource block includes a plurality of subcarriers in the frequency domain.

Each element on the resource grid is called a resource element. The resource elements on the resource grid can be discriminated by a pair of indexes (k,l) in the slot. Here, k (k=0, . . . , $N^{DL} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 8:
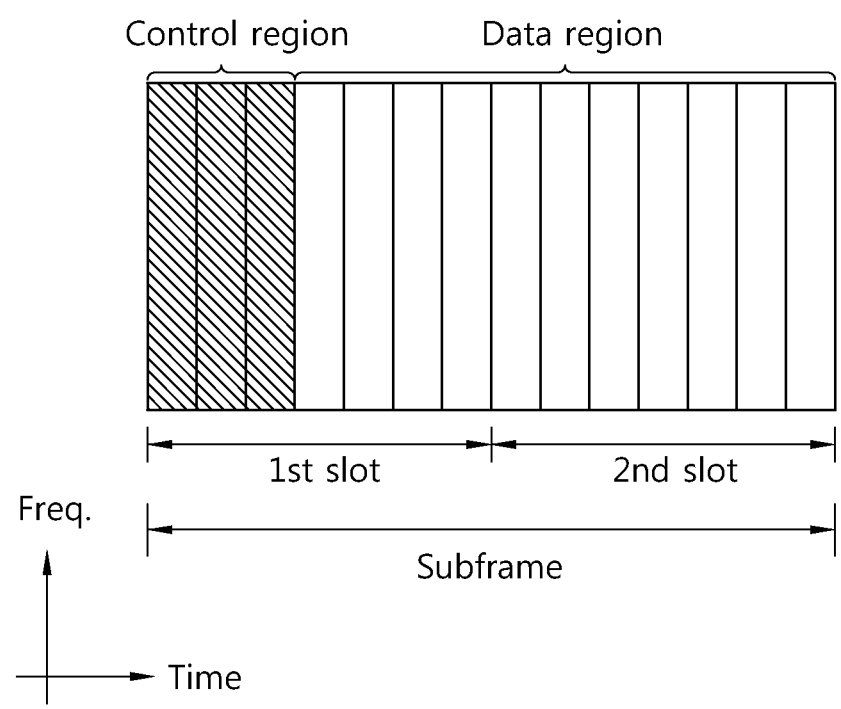
FIG. 8 is a view illustrating a structure of a downlink subframe.

FIG. 8 illustrates a structure of a downlink subframe. Referring to FIG. 8, a downlink subframe includes two consecutive slots. First three OFDM symbols of a first slot of the subframe is a control region to which a physical downlink control channel (PDCCH) is allocated, and the other remaining OFDM symbols is a data region to which a physical downlink shared channel (PDSCH) is allocated. Besides the PDCCH, a physical control format indicator channel (PCFICH), a physical HARQ indicator channel (PHICH), and the like, may be allocated to the control region. The UE may decode control information transmitted via a PDCCH to read data information transmitted via a PDSCH. Here, the inclusion of three OFDM symbols in the control region is merely illustrative, and two OFDM symbols or one OFDM symbol may be include in the control region. The number of OFDM symbols included in the control region of the subframe may be known through a PCFICH.

Control information transmitted via a PDCCH is called downlink control information (DCI). The DCI includes uplink scheduling information, downlink scheduling information, system information, an uplink power control command, control information for paging, control information for indicating an RACH response, and the like.

A DCI format includes format 0 for scheduling PUSCH (Physical Uplink Shared Channel), format 1 for scheduling PDSCH (Physical Downlink Shared channel) codeword, format 1A for compact scheduling of one PDSCH codeword, format 1B for compact scheduling with respect to rank-1 transmission of a single codeword in a spatial multiplexing mode, format 1C for very compact scheduling of DL-SCH (Downlink Shared Channel), format 1D for PDSCH scheduling in multi-user spatial multiplexing mode, format 2 for PDSCH scheduling in a closed-loop spatial multiplexing mode, format 2A for PDSCH scheduling in an open-loop spatial multiplexing mode, and format 3 for transmitting a TPC (Transmission Power Control) command for adjusting 2-bit power for PUCCH and PUSCH, format 3A for transmitting a TPC (Transmission Power Control) command for adjusting 1-bit power for PUCCH and PUSCH, and the like.

Figure 9:
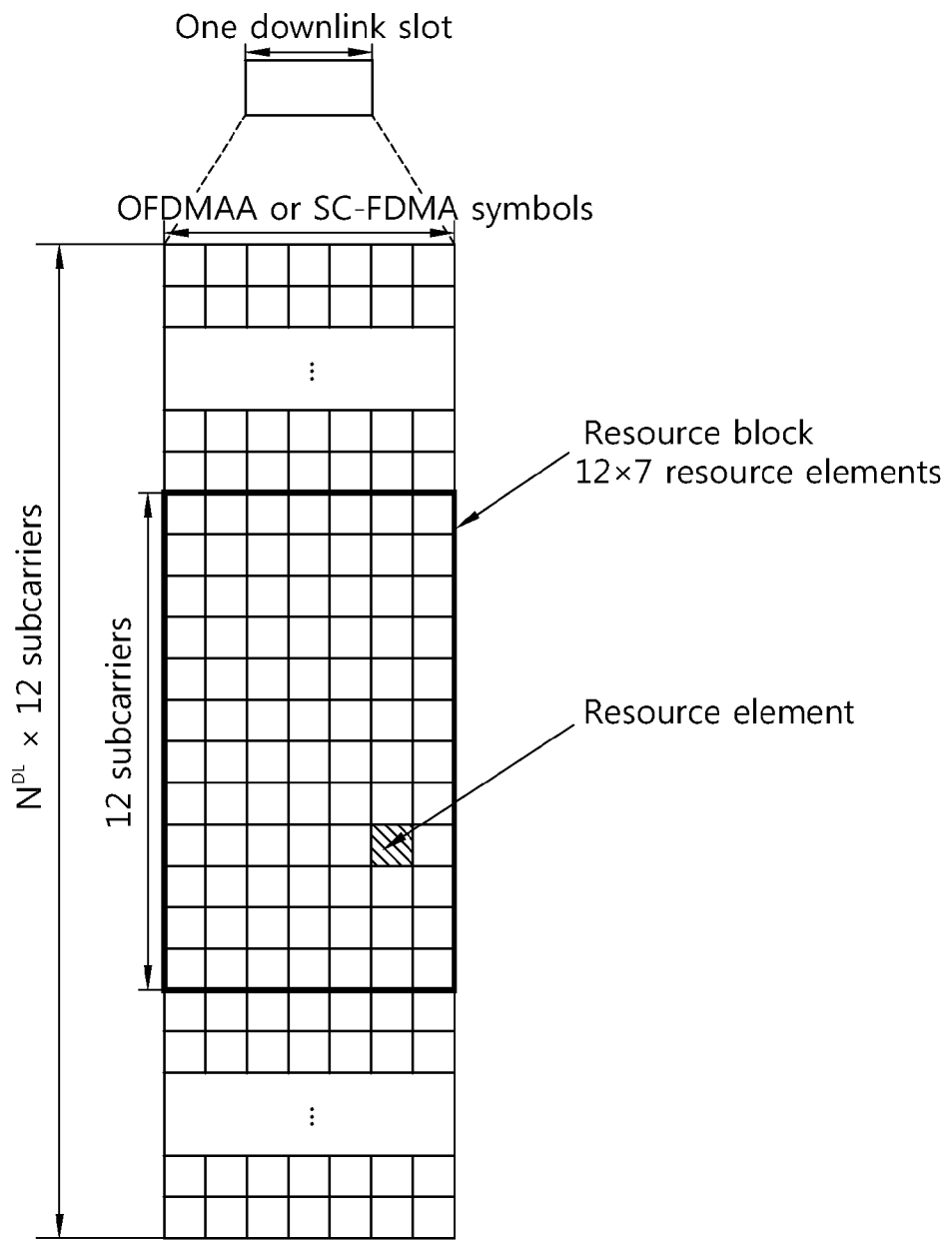
FIG. 9 is view illustrating a resource grid of a single uplink slot.

FIG. 9 is an exemplary view illustrating a resource grid of a single uplink slot. Referring to FIG. 9, an uplink slot includes a plurality of SC-FDMA or OFDMA symbols in a time domain and a plurality of resource blocks (RBs) in a frequency domain. Here, it is illustrated that one uplink slot includes seven SC-FDMA symbols and one resource block includes twelve subcarriers, but the present invention is not limited thereto. The number ($N^{UL}$) number of resource blocks included in the uplink slot is dependent upon an uplink transmission bandwidth set in a cell.

Figure 10:
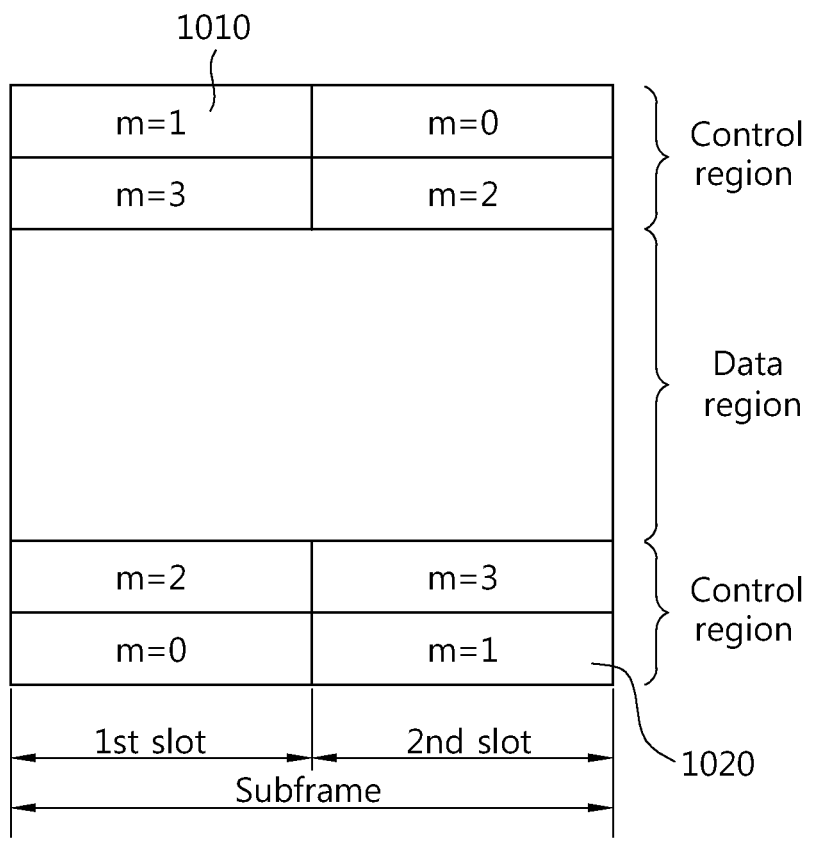
FIG. 10 is a view illustrating a structure of an uplink subframe.

FIG. 10 illustrates a structure of an uplink subframe. Referring to FIG. 10, an uplink subframe may be divided into control regions to which a PUCCH (Physical Uplink Control Channel) carrying uplink control information in the frequency domain is allocated and a data region to which a PUSCH (Physical Uplink Shared Channel) carrying user data is allocated. With respect to one terminal, a PUCCH is allocated to a pair of resource blocks (RBs) 1010 and 1020 in a subframe, and the RBs 51 and 52 occupy different subcarriers in each of two slots. This is called that a pair of RBs allocated to the PUCCH are frequency hopped in a slot boundary.

A specific method and apparatus for reporting a parameter related to energy (or power) consumption of a terminal to a base station will be described. A parameter related to energy consumption of a terminal includes information regarding the energy consumption of the terminal. A specific example of the parameter will be proposed hereinafter. The specific method and apparatus proposed hereinafter save energy (or power) of the terminal.

In a general communication system, a channel state of a BS and a terminal are recognized, based on which scheduling is performed. However, when scheduling is performed only based on a channel state, energy-efficient communication may be difficult. As a specific method and apparatus, the present invention proposes a method and apparatus for performing communication scheduling in consideration of energy (or power) consumption as well as a channel state. According to a specific example hereinafter, energy-efficient communication may be performed.

Hereinafter, a term such as energy, instead of power, is largely used for the description purpose. Energy is a concept which considers time. Energy can be obtained by reflecting time in power. Namely, energy and power are corresponding concepts, and as such, they may be mixedly used, but in the present disclosure, energy will be mainly used for the description purpose.

In a specific example hereinafter, a channel state is requested and reported. Namely, a channel state is additionally or separately estimated or measured for downlink and uplink, and reported. Also, the reported channel state and energy consumption are considered for communication between a terminal and a BS.

A parameter related to energy consumption of a terminal may be transmitted to a BS. The BS may estimate energy consumption of the terminal through information such as a channel state, or the like, but such estimation is not accurate. Thus, in order to solve the problem, a parameter related to energy consumption may be transmitted to the BS.

Figure 11:
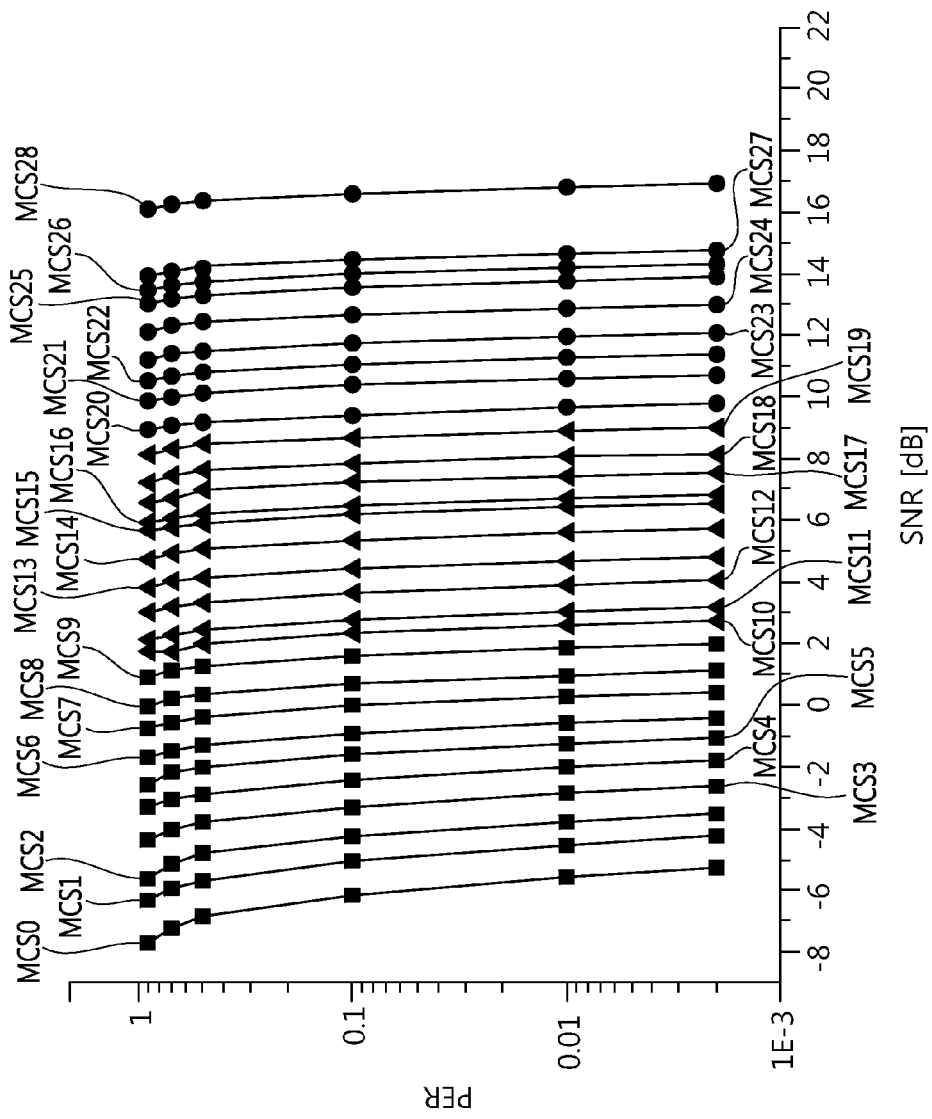
FIG. 11 is a view illustrating a relationship between an MCS and a PER in a wireless communication system.

FIG. 11 is a view illustrating a relationship between an MCS and a packet error rate (PER) in the wireless communication system. The example of FIG. 11 relates to a 3GPP LTE system. FIG. 11 shows a change in a PER over an MCS level in an AWGN (Additive white Gaussian noise) channel environment. An MCS level represents a level of constellation modulation and channel coding, which may be variously determined according to a wireless communication system. For example, in case of an 3GPP LTE system, an MCS level is described in detail in 3GPP TS 36.211 V9.0.0 (2009-12), "3rd Generation Partnership Project; Technical Specification Group Radio Access Network; Evolved Universal Terrestrial Radio Access (E-UTRA); Physical Channels and Modulation (Release 9)," December 2009, or the like. When the MCS level is high, constellation mapping of a relatively high order and relatively great channel coding may be performed. MCS levels may be discriminated by indices, and in this case, an MCS level represented by an adjacent index provides constellation mapping and channel coding of a proximity level. As illustrated, in a general system, an MCS level and a target PER are not directly proportional. Namely, transmission power of a terminal for a target PER is not directly proportional to an MCS level.

Thus, a BS cannot accurately recognize transmission power of a terminal based only on a channel state in performing scheduling. Thus, in a specific example hereinafter, a change in a parameter regarding transmission power of a terminal, as well as a channel state, may also be considered to perform energy-efficient communication.

For example, when transmission is performed by further using transmission power of 3 dB, an SNR is increased by 3 dB, and an MCS at a position 3 dB enhanced from an SNR determined to have an FER of 0.1 at a particular position of an MCS does not provide double spectral efficiency. Namely, for a terminal having restrictions with respect to power, it is more desirable to send data through more resource (e.g., a large number of subcarriers) at a low MCS by using small power, than setting to communicate with a high MCS level and high transmission power. Also, when various levels of power consumption, as well as the foregoing transmission power, are considered, a terminal may consider energy consumption in setting a particular MCS level, whereby a life span of a battery can be lengthened.

In a terminal and method according to an example hereinafter, a parameter related to energy consumption of the terminal is transmitted to a BS. The parameter related to energy consumption of the terminal represents energy consumption of the terminal. The level of energy consumption of the terminal may be determined based on a plurality of parameters including an MCS level of the terminal. For example, the terminal may calculate a parameter related to energy consumption of the terminal based on an MCS level of the terminal or based on a previously determined rule in a correspondence table. Also, the parameter related to energy consumption of the terminal may correspond to an MCS level currently used by the terminal or may correspond to the current MCS level currently used by the terminal and each of a plurality of MCS levels adjacent to the current MCS level. Namely, an energy consumption level corresponding to a plurality of MCS levels adjacent to the MCS level currently used by the terminal may be reported to a BS.

According to the example of FIG. 11, a relationship between the MCS level of the terminal and energy consumption of the terminal is fixed. However, a relationship between an MCS level and energy consumption of the terminal may be flexible. Namely, when a channel environment, rather than an AWGN environment, is applied, energy consumption of the terminal may be changed. Also, although a channel environment and an MCS level are the same, energy consumption of a terminal may differ according to a specific technique (a specific algorithm of hardware/software processing) implementing each terminal. Namely, a BS may estimate energy consumption of a terminal through a channel state or other information, but cannot accurately estimate energy consumption of a terminal. Thus, each terminal may report information regarding energy consumption to a BS and the BS may request a report from each terminal.

The parameter related to energy consumption of a terminal is affected by various communication techniques including an MCS level as well as a channel state. For example, processing energy consumption for receiving, by a terminal, a signal transmitted from a BS in downlink may differ according to a communication technique. Also, processing energy consumption for transmitting, by a terminal, a particular data/control signal to a BS in uplink may differ according to a communication technique. Also, transmission energy consumption for transmitting, by a terminal, a particular data/control signal to a BS in uplink may differ according to a communication technique. Also, processing energy consumption for a standby state or a channel estimation may differ according to a communication technique.

The foregoing communication technique refers to every technical feature affecting energy consumption of a terminal. For example, constellation modulation or a channel coding rate affects energy consumption of a terminal, so an MCS level is included in the foregoing communication technique. Also, technical features regarding whether or not MIMO is supported, a precoding matrix used when MIMO is applied, a MIMO technique, a MIMO rate, a codeword, a rank, a layer, and the like, are also included in the foregoing communication technique. The communication technique may include any types of communication techniques that may be selected by a BS or a terminal.

Figure 12:
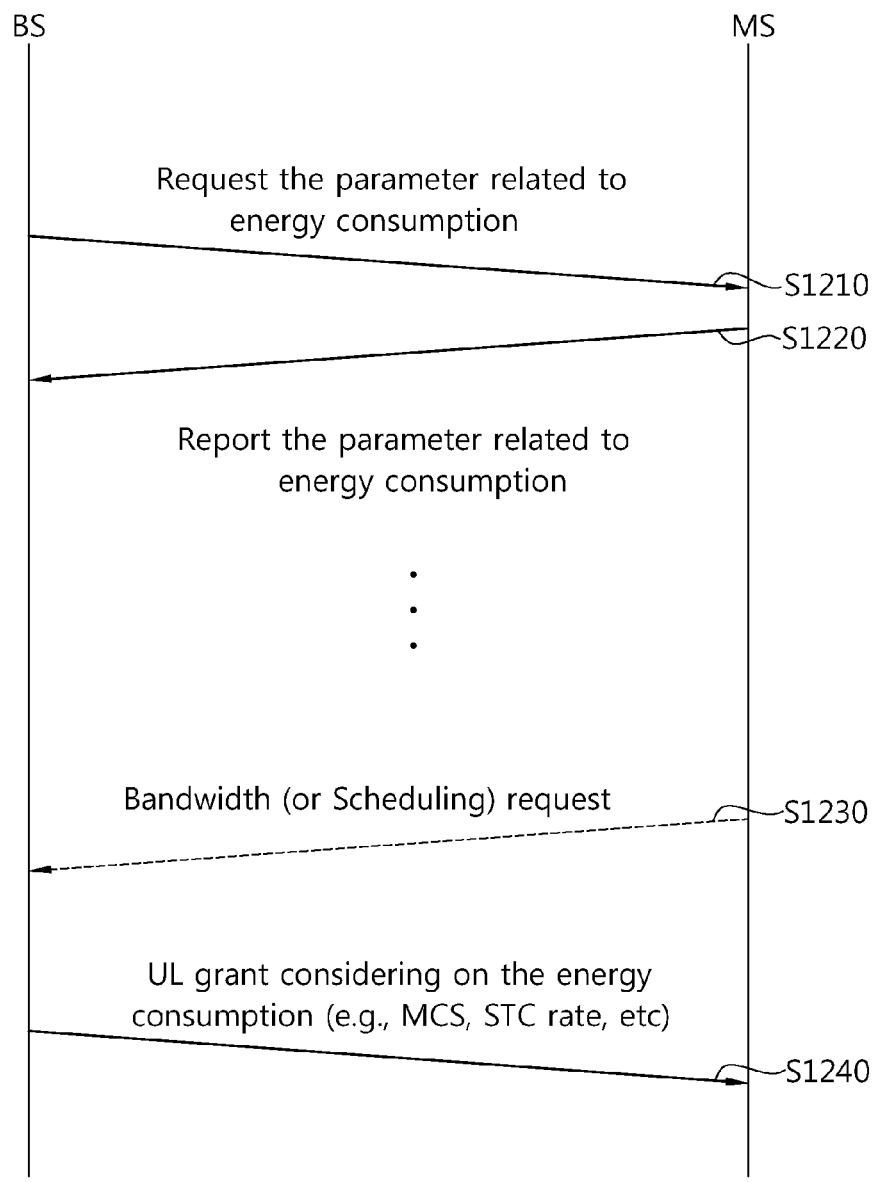
FIG. 12 is a view illustrating an operation of a mobile station (MS) and a base station (BS) according to an embodiment of the present invention.

FIG. 12 illustrates an operation of a terminal and a BS according to an embodiment of the present invention. As illustrated in FIG. 12, a terminal (or an MS) may transmit a parameter related to energy consumption according to a request from a BS. Namely, the MS may report information regarding energy consumption of the MS according to a communication technique (e.g., an MCS level) according to a request from the BS. In detail, the BS may request a parameter related to energy consumption from the MS (S1210). Upon receiving the request, the MS may report a parameter related to energy consumption of the MS to the BS (S1220). If necessary, the MS may transmit a message for requesting a bandwidth or a request for scheduling (S1230). The BS may transmit an uplink grant message for the MS according to the bandwidth request or scheduling request or irrespective of the request (S1240). In this case, the BS may determine a communication technique between the MS and the BS based on the parameter related to energy consumption reported from the MS. For example, the BS may determine an MCS level or an MIMO technique based on the parameter related to energy consumption reported from the MS. The determined communication technique may be used for communication between the MS and the BS. Also, the BS may determine a communication technique in consideration of an available energy level of the MS, a requested data transfer rate, and the like, or additionally in consideration of a type of the MS.

The example of FIG. 12 may be applied to both uplink and downlink. Namely, scheduling may be performed in consideration of the aspect of reception processing energy consumption of the MS in downlink and an aspect of transmission processing energy consumption and an aspect of transmission power of the MS in uplink.

In case of downlink, the MS may decode data through an additional operation such as MIMO decoding and channel decoding along with a routine procedure such as synchronization and channel estimation. When an MCS level that uses multiple antennas or provides a low code rate is selected from among various MCS levels, the MS consumes much processing power. Thus, in order to reduce power consumption while satisfying QoS, the MS may prefer having a high code rate (namely, less channel coding is used) or not using MIMO.

Such information may be reported to the BS. For example, the MS may report information regarding at least one MCS level and energy consumption according to at each MCS level to the BS, and may report ordered information in view of energy efficiency to the BS. Also, the MS may report whether or not energy consumption according to an MCS level can be accommodated by the MS to the BS. In this case, the MS may report whether or not a particular MCS level can be accommodated by the MS to the BS in an ON/OFF form. Alternatively, the MS may report a soft value to the BS such that the BS can calculate an energy consumption value of the MS. When a soft value is reported, the BS may determine the soft value regarding energy consumption as a relative value based on a pre-set reference value such that the same re port method may be used for similar MSs. In this case, the relative value may be quantized.

Alternatively, the MS may define information such as an energy consumption rate regarding a remaining battery capacity, and report the same to the BS. Alternatively, the MS may simply report absolute power consumption by watt. A component of energy consumption may be divided into a dynamic part and a static part. For example, a part common to every communication technique is included in the static part, and energy consumption generated according to actual reception according to a particular communication technique may be included in the dynamic part.

In case of uplink, unlike downlink, generally, a BS estimates a channel between an MS and the BS and sets an appropriate MCS. Thus, the MS may perform uplink communication according to an instruction from the BS without affecting a communication technique (e.g., an MCS level). However, in view of actual energy consumption or battery preservation, preferably, energy consumed by the MS is considered. The reason is because energy consumed by the MS cannot be accurately calculated only with a channel state. Thus, when the BS requests a measurement value with respect to energy consumption, preferably, the MS first reports energy consumption thereof (e.g., energy consumption regarding transmission power or processing power), and the like, to the BS, while communicating according to a communication technique determined by the BS. In the case of uplink, energy consumption may be reported to the BS in a manner similar to that of downlink. However, since radio waves are transmitted unlike downlink, transmission power is an important factor, which is absolutely affected by an MCS level and also by a current power level. Thus, in setting a static part and a dynamic part, the dynamic part should report information regarding dynamic energy consumption in a particular communication technique.

A parameter related to energy consumption of the MS may be transmitted through an independent message as described above, or may be included in a conventional message or channel as explained hereinafter. In detail, the parameter related to energy consumption of the MS may be transmitted via a physical channel or included in a logical channel. For example, the parameter may be transmitted through a CQI channel, a bandwidth request message/scheduling request message.

Figure 13:
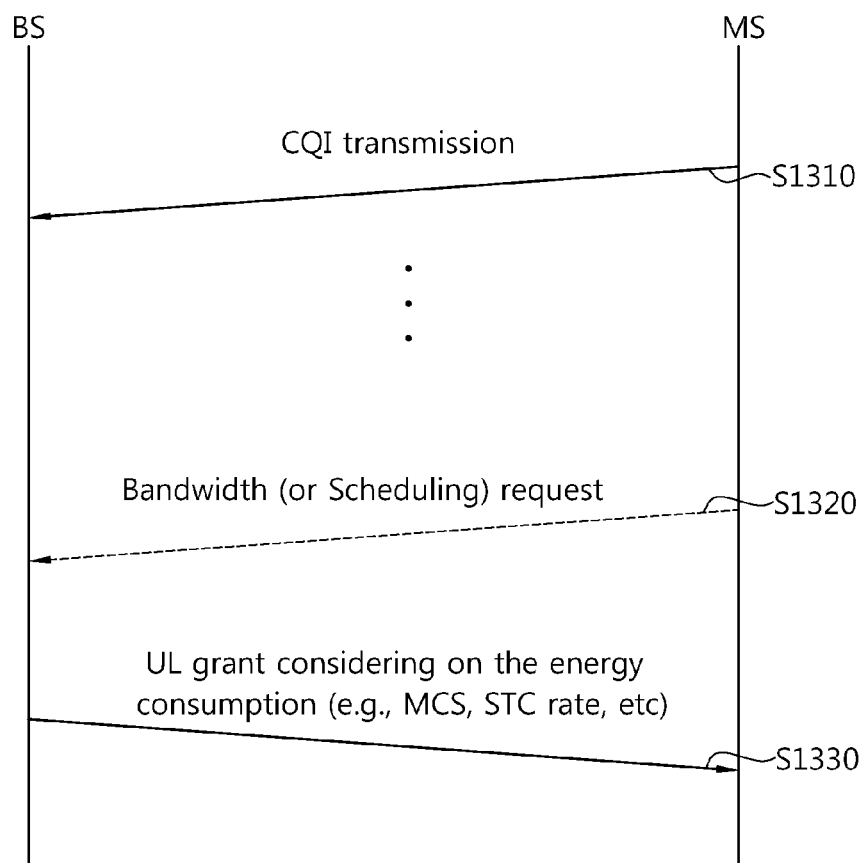
FIG. 13 is a view illustrating another example of an operation of the MS and the BS.

FIG. 13 illustrates another example of an operation of the MS and the BS. In the example of FIG. 13, the BS may not request the parameter related to energy consumption of the MS. The MS that may generate the parameter related to energy consumption may add the parameter related to energy consumption of the MS, as well as a channel state, to calculate an enhanced CQI, and report the same to the BS.

In calculating the CQI, the MS may add the parameter related to energy consumption, and accordingly, the BS may reflect energy consumption of the MS in scheduling (e.g., MCS selection, MIMO mode selection, or the like).

In order to adjust content reported by the MS, the BS may instruct whether or not the MS should report only a channel state as in the related art, or whether the MS should report a channel state by including additional considerations (e.g., energy consumption or remaining battery capacity). Upon receiving the instruction from the BS, the MS may report a channel state (for example, it may include information regarding a communication technique such as a CQI, a PMI, or an RI) (S1310). If necessary, the MS may transmit a message for requesting a bandwidth or scheduling (S1320). In determining resource and communication technique (e.g., an MCS level or an MIMO mode) of the MS, the BS may select a communication technique for reducing energy consumption of the MS by using already known information regarding energy consumption of the MS (S1330).

Figure 14:
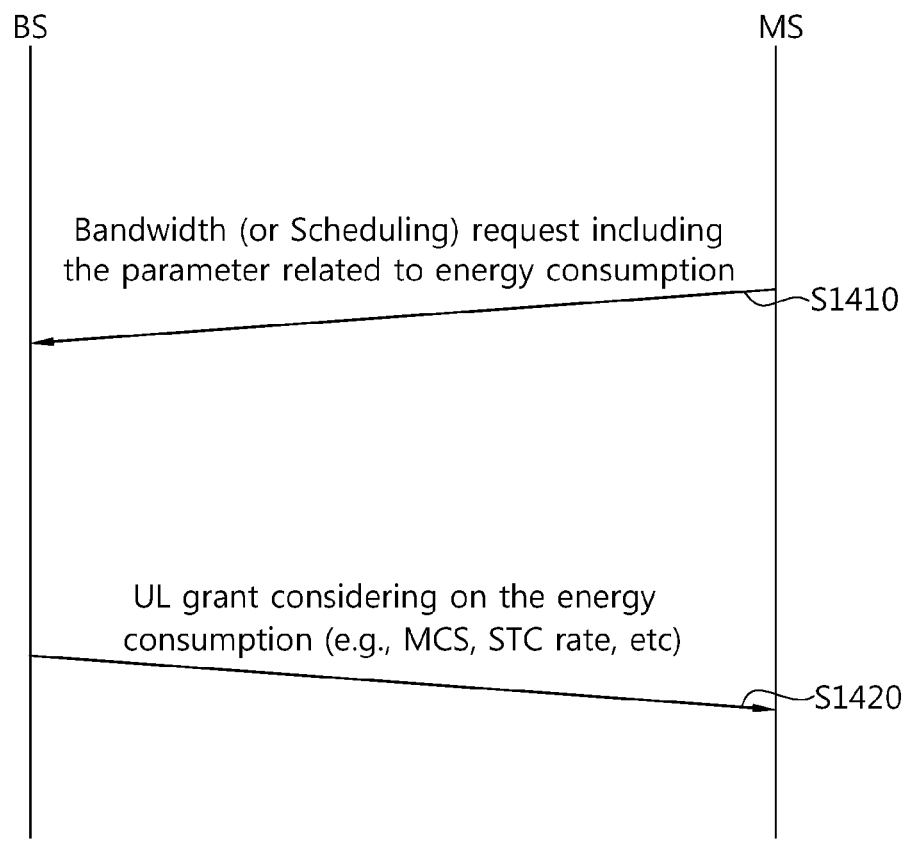
FIG. 14 is a view illustrating another example of an operation of the MS and the BS.

FIG. 14 illustrates another example of an operation of the MS and the BS. In the example of FIG. 14, a particular MS may report information regarding energy consumption according to a communication technique (e.g., an MCS level, or the like). The report may be requested only for some of MSs.

In the example of FIG. 14, the BS may not request information regarding energy consumption from the MS. However, the MS that may transmit a parameter related to energy consumption may add the corresponding parameter and report the same to the BS. Namely, the MS may include the parameter related to energy consumption regarding its uplink in a bandwidth request or scheduling request (S1410). In determining resource and communication technique (e.g., an MCS level or an MIMO mode) of the MS, the BS may select a communication technique for saving energy consumption of the MS by using the received parameter related to energy consumption of the MS (S1420).

The MS may report the parameter related to energy consumption of the MS during a process of negotiation with the BS. In a situation in which a channel state is not greatly changed, the MS and the BS may not need to repeatedly report the parameter related to energy consumption. In this case, the MS may report information regarding energy consumption according to a communication technique (e.g., an MCS level) during the process of negotiation with the BS.

Figure 15:
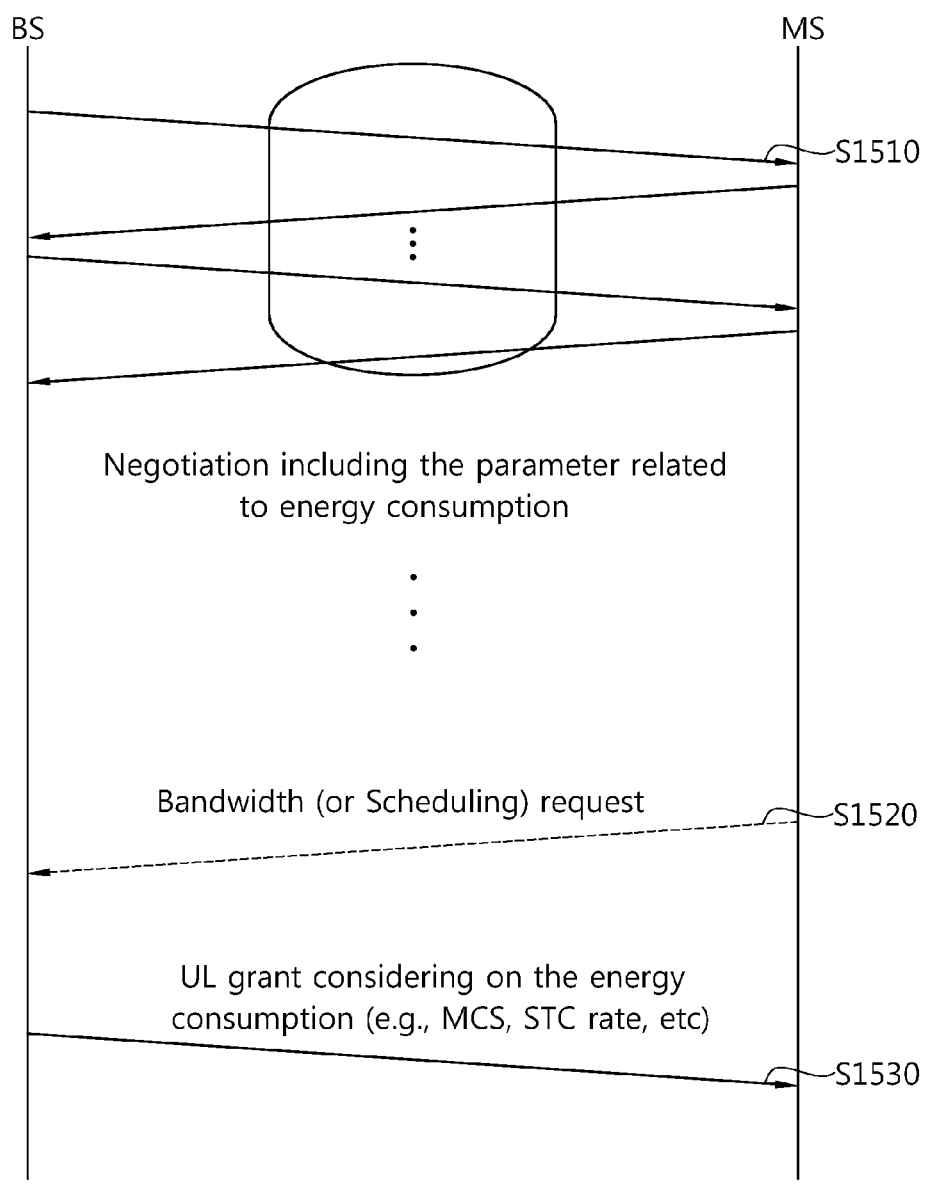
FIG. 15 is a view illustrating another example of an operation of the MS and the BS.

FIG. 15 illustrates another example of an operation of the MS and the BS. During an initial negotiation process between the BS and the MS, the MS may transmit the parameter related to energy consumption thereof to the BS (S1510). If necessary, the MS may transmit a message for requesting a bandwidth or scheduling (S1520). When determining resource and a communication technique (e.g., an MCS level or an MIMO mode) of the MS, the BS may select a communication technique that may save energy of the MS by using the parameter (S1530).

The example of FIG. 15 may be applied to downlink and uplink, respectively. Namely, processing power of the MS in downlink and processing power and transmission power of the MS in uplink may be considered, respectively. Also, information regarding energy consumption according to a particular communication technique may be reported in the negotiation stage, and information regarding energy consumption according to a different communication technique may be reported after the negotiation (e.g., reported through a separate message or the conventional physical/logical channel).

The MS according to the examples of FIGS. 12 through 15 may report the parameter related to energy consumption of the MS to the BS only when a battery level is equal to or less than a threshold value. Also, the BS according to the examples of FIGS. 12 through 15 may not consider energy consumption until before the battery level of the MS is dropped to a certain level.

Meanwhile, when information related to energy consumption is reported according to the foregoing examples, the MS may delay reporting of energy consumption until when information is sufficiently collected or may report related to energy consumption on the assumption of a situation in which information is collected to a degree.

The MS may request designation of a communication technique specified by the MS itself. In this case, the BS may communicate with the MS according to a communication technique (e.g., an MCS level or an MIMO mode) designated by the MS. The MS may determine a preferred communication technique based on energy consumption thereof. When an extra operation is performed while the MS is performing communication, energy consumption may vary over time. In this case, energy consumption may be increased up to a level which is not allowable according to a MS, and in such a case, the MS may request a communication technique according to a current situation. The MS may request a particular communication technique by using the foregoing physical channel, a logical channel such as an MAC channel, or the like, or may request a communication technique according to a request from the BS. The MS may request changing of a communication technique or limit a type of an available communication technique. For example, the MS may limit such that only some of a plurality of MCS levels are used. Also, the MS may report a changed level of energy consumption or remaining energy capacity available in the future. Accordingly, the MS may maintain a normal operation by itself.

The operations of FIGS. 12 through 15 may be operated together, rather than being separately operated. Namely, although some parameters are transmitted in the negotiation stage as shown in FIG. 15, parameters may be transmitted through a separate message, a conventional physical/logical channel, and the like, as shown in FIGS. 12 through 14. Namely, the respective embodiments may be combined.

Also, the operations in FIGS. 12 through 15 may be activated according to a remaining battery capacity. Namely, the operations in FIGS. 12 through 15 may be applied only when a remaining battery capacity is equal to or less than a particular level. Also, some of the examples of FIGS. 12 through 15 may be applied irrespective of a remaining battery capacity, and whether to apply the other may be determined according to a remaining battery capacity.

Figure 16:
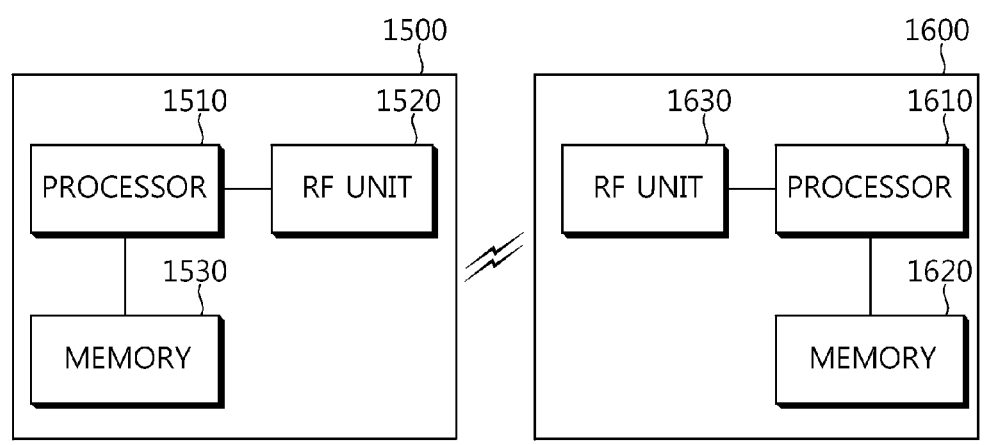
FIG. 16 is a view illustrating an example of an MS and a BS.

FIG. 16 illustrates a mobile station (MS) and a base station (BS). A MS 1500 includes a processor 1510, a memory 1530, and an RF unit 1520. The processor 1510 may allocate radio resource according to information previously stored therein, or the like. Procedures, techniques, and functions performed by the MS in the foregoing embodiments may be implemented by the processor 1510. The memory 1530 is connected to the processor 1510 and stores various types of information for driving the processor 1510. The RF unit 1520 is connected to the processor 1510 and transmits and/or receives a radio signal.

A BS 1600 includes a processor 1610, a memory 1620, and an RF unit 1630. Procedures, techniques, and functions performed by the MS in the foregoing embodiments may be implemented by the processor 1610. The memory 1620 is connected to the processor 1610 and stores various types of information for driving the processor 1610. The RF unit 1630 is connected to the processor 110 and transmits and/or receives a radio signal.

The processors 1510 and 1610 may include an ASIC (Application-Specific Integrated Circuit), a chip-set, a logical circuit, and/or a data processor. The memories 1530 and 1620 may include a ROM (Read-Only Memory), a RAM (Random Access Memory), a flash memory, a memory card, a storage medium, and/or any other storage devices. The RF units 1520 and 1630 may include a baseband circuit for processing a radio signal. When the embodiments are implemented by software, the foregoing techniques may be implemented by modules (processes, functions, or the like) performing the foregoing functions. The modules may be stored in the memories 1530 and 1620 and executed by the processors 1510 and 1610, respectively. The memories 1530 and 1620 may be provided within or outside the processors 1510 and 1610 and may be connected to the processors 1510 and 1610 through a well-known unit, respectively.

The method and apparatus as described above may be implemented by hardware, software, or a combination thereof. For hardware implementation, the method and apparatus as described above may be implemented by using application specific integrated circuits (ASICs), digital signal processors (DSPs), programmable logic devices (PLDs), field programmable gate arrays (FPGAs), processors, controllers, microprocessors, electronic units, or a combination thereof, designed to perform the foregoing functions. For software implementation, the method and apparatus as described above may be implemented by a module performing the foregoing functions. Software may be stored in a memory unit and executed by a processor. As the memory unit or the processor, various means well known to a person skilled in the art may be employed.

While the present invention has been shown and described in connection with the embodiments, it will be apparent to those skilled in the art that modifications and variations can be made without departing from the spirit and scope of the invention as defined by the appended claims.

The invention claimed is:

1. A method for performing communication by a terminal in a wireless communication system, the method comprising:
   estimating an energy consumption level of the terminal for a current modulation and coding scheme (MCS) level used for the terminal, and configuring first information indicating the energy consumption level for the current MCS level;
   estimating a plurality of energy consumption levels of the terminal for a plurality of candidate MCS levels applicable to the terminal, and configuring second information indicating the plurality of energy consumption levels for the plurality of candidate MCS levels;
   transmitting a parameter related to energy consumption to a base station (BS), wherein the parameter related to energy consumption includes the first information, the current MCS level, the second information, the plurality of candidate MCS levels, a precoding matrix indicator (PMI), and a rank indicator (RI);
   after transmitting the parameter, transmitting a bandwidth request message or a scheduling message to the BS;
   after transmitting the bandwidth request message or scheduling message, receiving, from the BS, information regarding a communication technique determined based on the parameter; and
   performing communication with the BS according to the determined communication technique,
   wherein the transmitting of the parameter related to energy consumption of the terminal to the BS is performed only when a remaining battery capacity of the terminal is equal to or less than a threshold value.

2. The method of claim 1, further comprising:
receiving a request message for requesting the parameter from the BS, before the parameter related to energy consumption of the terminal.

3. The method of claim 1, wherein the information regarding a communication technique is at least one of information regarding an MCS level of the terminal and information regarding a MIMO (multiple-input and multiple-output) technique of the terminal, and
in the performing of communication with the BS according to the determined communication technique, communication is performed according to the MCS level and the MIMO technique.

4. The method of claim 1, wherein the parameter related to energy consumption of the terminal is transmitted via a CQI (channel quality indicator) channel.

5. The method of claim 1, wherein the parameter related to energy consumption of the terminal is included in a bandwidth request message or a scheduling request message.

6. The method of claim 1, wherein the wireless communication system performs communication by using an OFDMA (orthogonal frequency-division multiple access) symbol or an SC-FDMA (single-carrier frequency-division multiple access) symbol.

7. The method of claim 1, wherein the plurality of candidate MCS levels are adjacent to the current MCS level.

8. A terminal of a wireless communication system, the terminal comprising:
a processor configured to control an operation of the terminal; and
a transceiver unit controlled by the processor and configured to:
estimate an energy consumption level of the terminal for a current modulation and coding scheme (MCS) level used for the terminal, and configure first information indicating the energy consumption level for the current MCS level;
estimate a plurality of energy consumption levels of the terminal for a plurality of candidate MCS levels applicable to the terminal, and configure second information indicating the plurality of energy consumption levels for the plurality of candidate MCS levels;
transmit a parameter related to energy consumption to a base station (BS), wherein the parameter related to energy consumption includes the first information, the current MCS level, the second information, the plurality of candidate MCS levels, a precoding matrix indicator (PMI), and a rank indicator (RI);
after transmitting the parameter, transmit a bandwidth request message or a scheduling message to the BS;
after transmitting the bandwidth request message, receive, from the BS, information regarding a communication technique determined based on the parameter; and
perform communication with the BS according to the determined communication technique,
wherein the parameter related to energy consumption of the terminal is transmitted to the BS only when a remaining battery capacity of the terminal is equal to or less than a threshold value.

9. The terminal of claim 8, wherein the plurality of candidate MCS levels are adjacent to the current MCS level.

\* \* \* \* \*